(12) United States Patent
Gaither

(10) Patent No.: US 6,771,816 B1
(45) Date of Patent: Aug. 3, 2004

(54) GENERATING A TEXT MASK FOR REPRESENTING TEXT PIXELS

(75) Inventor: Shawn A. Gaither, Santa Cruz, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/487,546

(22) Filed: Jan. 19, 2000

(51) Int. Cl.[7] .............................. G06K 9/34
(52) U.S. Cl. .......................... 382/176; 382/164
(58) Field of Search ................. 382/162–167, 382/173–180; 345/797–828

(56) References Cited

U.S. PATENT DOCUMENTS

| | | | |
|---|---|---|---|
| 5,625,711 A | | 4/1997 | Nicholson et al. |
| 5,729,637 A | | 3/1998 | Nicholson et al. |
| 5,778,092 A | * | 7/1998 | MacLeod et al. ........... 382/176 |
| 5,940,080 A | * | 8/1999 | Ruehle et al. ............... 345/432 |
| 5,977,960 A | * | 11/1999 | Nally et al. .................. 345/191 |
| 5,999,649 A | | 12/1999 | Nicholson et al. |
| 6,320,982 B1 | * | 11/2001 | Kurzweil et al. ........... 382/162 |
| 6,493,005 B1 | * | 12/2002 | Wu ............................ 345/804 |

OTHER PUBLICATIONS

"Blue Screen Matting", *ACM Computer Graphics Proceedings, Annual Conference Series*, 1996, Alvy Ray Smith and James F. Blinn, pp. 259–268.
*Adobe Photoshop Version 5.0 User Guide*, 1998, Chapters 7, 10, & 12, pp. 137–164, 239–255, 291–298.

\* cited by examiner

*Primary Examiner*—Jingge Wu
(74) *Attorney, Agent, or Firm*—Fish & Richardson P.C.

(57) ABSTRACT

A method and apparatus, including computer program apparatus, implementing techniques for processing an image using one or more text masks to represent lexical units representing text. The techniques can include generating at least one text mask distinguishing between at least the text pixels and the background pixels of at least one lexical unit in the image; storing the text mask in an electronic document representing the image; receiving an electronic document including at least one text mask distinguishing between at least the text pixels and the background pixels of at least one lexical unit in the image; and using at least one text mask to generate a representation of the lexical unit for display on an output device. An electronic document representing an image can include a representation of the image in a page description language including at least one text mask distinguishing between at least the text pixels and the background pixels of at least one lexical unit in the image.

24 Claims, 6 Drawing Sheets

GENERATING A TEXT MASK FOR REPRESENTING TEXT PIXELS

BACKGROUND OF THE INVENTION

The present invention relates to computer-implemented methods and apparatus for displaying text images.

A text document, such as one on a piece of paper, can be converted into a digital representation by digitization. A digital representation of a document can be divided into lexical units such as characters or words and each unit can be represented in a coded or noncoded representation.

A coded representation of text is character based; that is, it is a representation in which the text is represented as recognized characters. The characters are typically represented by character codes, such as codes defined by the ASCII or Unicode Standard character encoding standards, but may also be represented by character names. The universe of characters in any particular context can include, for example, letters, numerals, phonetic symbols, ideographs, punctuation marks, diacritics, mathematical symbols, technical symbols, arrows, dingbats, and so on. A character is an abstract entity that has no inherent appearance. How a character is represented visually—e.g., as a glyph on a screen or a piece of paper—is generally defined by a font defining a particular typeface. In digital or computer-based typography applications, a digital font, such as any of the PostScript™ fonts available from Adobe Systems Incorporated of San Jose, Calif., generally includes instructions (commonly read and interpreted by rendering programs executing on computer processors) for rendering characters in a particular typeface. A coded representation can also be referred to as a character-based representation.

A noncoded representation of text is a primitive representation in which the text is represented as an image, not as recognized characters. A noncoded representation of text may include an array of picture elements ("pixels"), such as a bitmap. In a bitmap, each pixel is represented by one binary digit or bit in a raster. A pixel map (or "pixmap") is a raster representation in which each pixel is represented by more than one bit.

Digitization of an image generally results in a primitive representation, typically a bitmap or pixel map. If the image contains text, the primitive representation can be interpreted and converted to a higher-level coded format such as ASCII through use of an optical character recognition (OCR) program. A confidence-based recognition system—such as the one described in commonly-owned U.S. Pat. No. 5,729,637 (the '637 patent), which is incorporated by reference herein—processes an image of text, recognizes portions of the image as characters, words and/or other units, and generates coded representations for any recognized units in the image. Some units may be recognized only with a low level of confidence or not recognized at all. When the image is displayed, low-confidence units may be displayed in their original image form, while those recognized with sufficiently high confidence are displayed as rendered bitmaps derived from their coded representations.

A digital representation of an image including both coded and noncoded units can be displayed on a raster output device such as a computer display or printer. This type of display, i.e., one containing both portions of the original bitmap or pixel map and rendered bitmaps, will be referred to as a hybrid display. The coded units are rendered (i.e., rasterized), which may be accomplished in a variety of ways, such as by retrieving an output bitmap stored in memory for a code or by computing an output bitmap according to a vector description associated with a code. The result will be referred to as rasterized text. The noncoded units are displayed in their original image form, which will be referred to as a text pixmap. Typically, whole words are represented either as rasterized text or as a text pixmap for display on raster output devices.

Text pixmaps often exhibit color variation effects that result from improper color registration during digitization. This color variation may appear as "edge effects"—fringes or halos around the edges of characters when a text pixmap is displayed—as shown in FIG. 3A, and may not be aesthetically pleasing. Such color variation effects may be especially noticeable when a text pixmap is displayed with rasterized text, which typically does not exhibit such effects.

Text pixmaps may also exhibit a "ghosting" effect when displayed, resulting from the local background on which a text pixmap is typically displayed, as shown in FIG. 4A. When a text pixmap is to be displayed against a global background, such as where the pixmap is to be displayed with rasterized text in a hybrid display, this local background may not match the global background of the hybrid display on which the text pixmap and rasterized text is to be rendered. For example, the global background of a hybrid display may be assigned a color that is uniform over the entire global background. By contrast, the color of the local background of the text pixmap may vary over the pixmap. When the text pixmap is displayed against the global background of the hybrid display, ghosting may appear as a result of the color mismatch between the local background of the pixmap and the global background. As shown in FIG. 4A, this ghosting effect can be quite noticeable and can be aesthetically unpleasant.

SUMMARY OF THE INVENTION

In general, in one aspect, the invention provides a method and apparatus, including computer program apparatus, implementing techniques for processing an image including one or more lexical units each representing a unit of text, in which each lexical unit is defined by a number of image pixels and a number of background pixels. The techniques include generating at least one text mask distinguishing between at least the text pixels and the background pixels of at least one lexical unit in the image and storing the text mask in an electronic document representing the image.

Implementations of the invention include one or more of the following features. The text mask can include a raster representation of the pixels of at least one lexical unit, including a first set of pixels corresponding to the text pixels of the lexical unit and a second set of pixels corresponding to at least the background pixels of the lexical unit. Generating the text mask can include assigning the first set of pixels in the raster representation a first pixel value and assigning the second set of pixels in the raster representation a second pixel value. Generating the text mask can include reversing the pixel value of each pixel in the raster representation. Generating the text mask can include assigning an intermediate pixel value to pixels in the raster representation at a boundary between the first and second set of pixels in the raster representation. The text mask can include a vector representation of the text. If the image includes more than one page, a separate text mask may be stored for each page of the image. If the image includes lexical units representing units of text in more than one color, a separate text mask may be stored for the lexical units representing units of text in each color. If the image includes more than one lexical unit, a separate text mask may be stored for each lexical unit. The text mask can be stored in a hybrid data structure. The electronic document can include a page description language representation of at least one lexical unit in the image. Generating the text mask can include identifying the text pixels in an OCR process.

In general, in another aspect, the invention provides a method and apparatus, including computer program apparatus, implementing techniques for processing an image including one or more lexical units each representing a unit of text, each lexical unit being defined by a plurality of image pixels and a plurality of background pixels. The techniques include generating at least one text mask distinguishing between at least the text pixels and the background pixels of at least one lexical unit in the image and using the text mask to generate a representation of the lexical unit for display on an output device.

Implementations of the invention include one or more of the following features. The background pixels can represent a local background, and using the text mask can include generating a representation of the lexical unit for displaying the unit of text without displaying the local background. The text mask can include a raster representation of the pixels of at least one lexical unit, including a first set of pixels corresponding to the text pixels of the lexical unit and a second set of pixels corresponding to at least the background pixels of the lexical unit. If the image includes more than one page, a separate text mask may be used to generate representations of one or more lexical units on each page of the image for display. If the image includes lexical units representing units of text in more than one color, a separate text mask may be used to generate representations for display of the lexical units representing units of text in each color. If the image includes a more than one lexical unit, a separate text mask may be used to generate representations for display of each lexical unit. Using the text mask to generate a representation of the lexical unit for display can include assigning each of the first set of pixels a pixel value corresponding to a text color, and can also include assigning each of the second set of pixels a pixel value corresponding to a background color. Using the text mask to generate a representation of the lexical unit for display can include rendering the text on a global background. The image can include a background defined by a number of image background pixels and the global background can have a background color that is a function of one or more pixel values of the image background pixels, such as an average of the pixel values of the image background pixels. The text mask can be used to generate a representation of the lexical unit for display on a raster-output device, such as a printer, a raster scan display, and a digital typesetter. The text mask can be stored, such as in a hybrid data structure. The electronic document can include a page description language representation of at least one lexical unit in the image.

In general, in another aspect, the invention provides a method and apparatus, including computer program apparatus, implementing techniques for processing an image including one or more lexical units each representing a unit of text, each lexical unit being defined by a plurality of image pixels and a plurality of background pixels. The techniques include receiving an electronic document representing the image, including at least one text mask distinguishing between at least the text pixels and the background pixels of at least one lexical unit in the image and using the text mask to generate a representation of the lexical unit for display on an output device.

In general, in another aspect, the invention provides an electronic document representing an image including one or more lexical units each representing a unit of text, each lexical unit being defined by a plurality of image pixels and a plurality of background pixels. The electronic document includes a representation of the image in a page description language including a coded representation of at least one recognized lexical unit in the image and at least one text mask distinguishing between at least the text pixels and the background pixels of at least one unrecognized lexical unit in the image. In particular implementations, the page description language can be PDF, PostScript, RTF, HTML, SGML, XML or the like.

In general, in another aspect, the invention provides a method and apparatus, including computer program apparatus, implementing techniques for processing an image including one or more recognized lexical units each representing a unit of text, in which each lexical unit is defined by a plurality of image pixels and a plurality of background pixels and the image includes one or more recognized lexical units representing a recognized unit of text and one or more unrecognized lexical units representing an unrecognized unit of text. The techniques include generating at least one text mask distinguishing between at least the text pixels and the background pixels of at least one unrecognized lexical unit in the image and generating an electronic document representing the image. The electronic document includes a recognized text description representing the recognized lexical units and an unrecognized text description derived from the at least one text mask. In particular implementations of the invention, the electronic document can include a representation of the image in a page description language. The page description language can be PDF, PostScript, RTF, HTML, SGML, XML or the like.

Advantages that can be seen in implementations of the invention include one or more of the following. The use of a text mask to render text with a uniform text color can reduce the occurrence of color variation effects including edge effects. The use of a text mask to mask off a local text background can reduce the occurrence of ghosting effects. Using a text mask to represent text can require less storage space than using a pixelmap.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
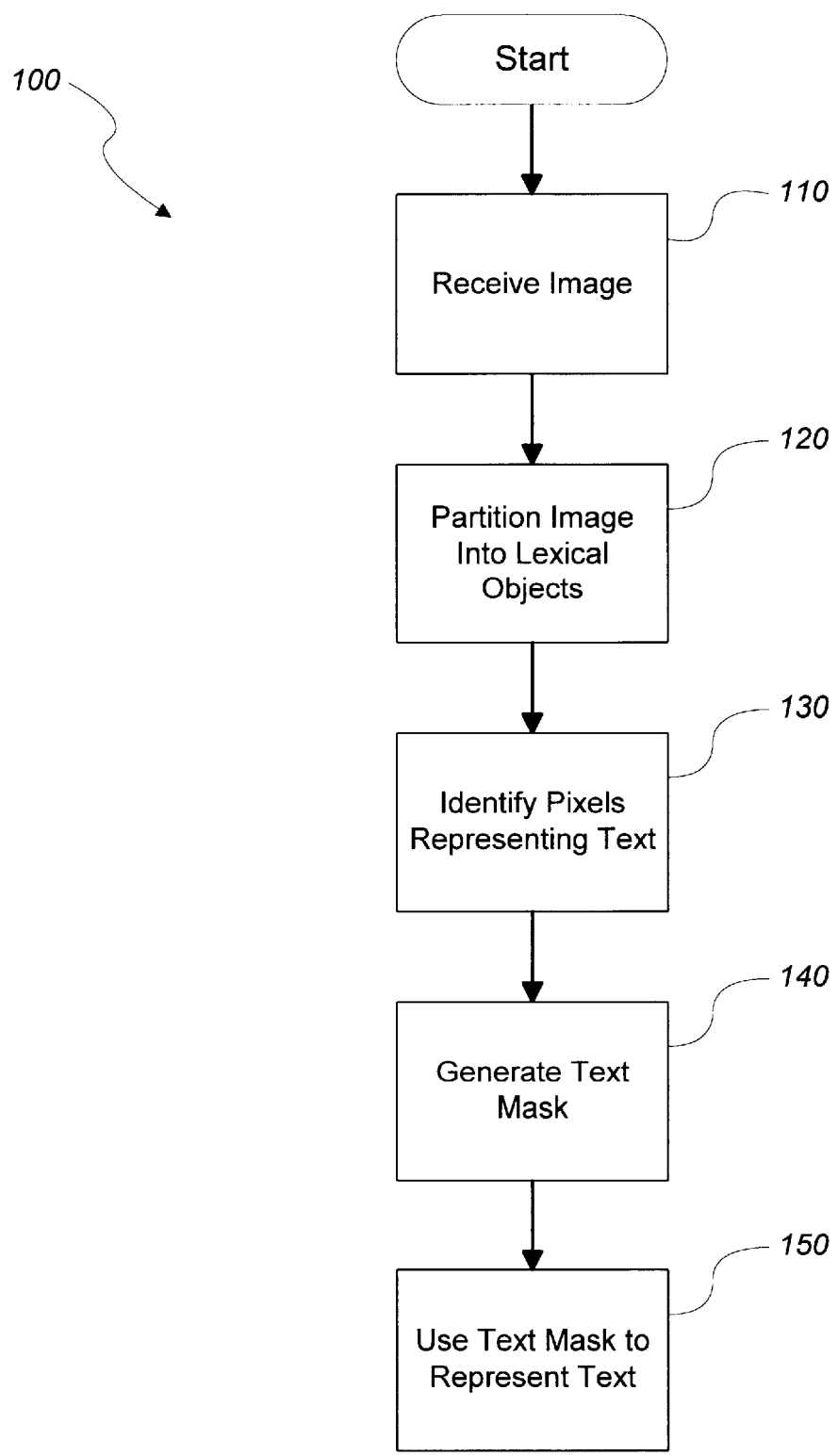
FIG. 1 is a flow diagram illustrating a method of generating a text mask that can be used to represent text.

FIG. 1 is a flow diagram of a method 100 of generating a text mask that can be used to represent text. The method 100 can be implemented in a computer application program, such as a module in a larger system for processing and displaying electronic documents, a plug-in module, a module in driver software for an output device, a module in a page description language interpreter (such as a PostScript® language interpreter), in an output device such as a printer, or otherwise.

The application receives an input such as a text image, for example, a digital representation of a document containing text generated by scanning or otherwise digitizing the document (step 110). Optionally, if the image has not been subjected to text recognition protocols such as optical character recognition, the application can partition the image into one or more lexical units characterized by a position in the image, and can identify pixels that represent text in the image—for example, by applying text recognition methods such as those described in the '637 patent and in the commonly-owned U.S. patent application Ser. No. 08/865,021, filed May 29, 1997, titled "Recognizing Text in a Multicolor Image," and Ser. No. 08/991,584, filed Dec. 16, 1997, titled "Removing Non-Text Information From A Color Image," which are incorporated by reference herein (steps 120 and 130). The application generates a text mask corresponding to the text pixels (step 140). In one implementation, the text mask is an array of pixels (e.g., a bitmap) in which the pixels representing text are set to a given value (e.g., an "off" or "0" value, in the case of a bitmap) and the pixels representing the local background are set to another value or values (e.g., an "on" or "1" value, in the case of a bitmap). The application uses the text mask to display the text on an output device (step 150). In general, the application generates a text mask for one or more, or all of the noncoded units in the document, and uses the text masks to represent the text associated with the noncoded units (e.g., by rendering the text on a global background of a hybrid display using the text mask or masks and/or by generating and storing an electronic document including or referring to the text mask or masks).

Figure 2:
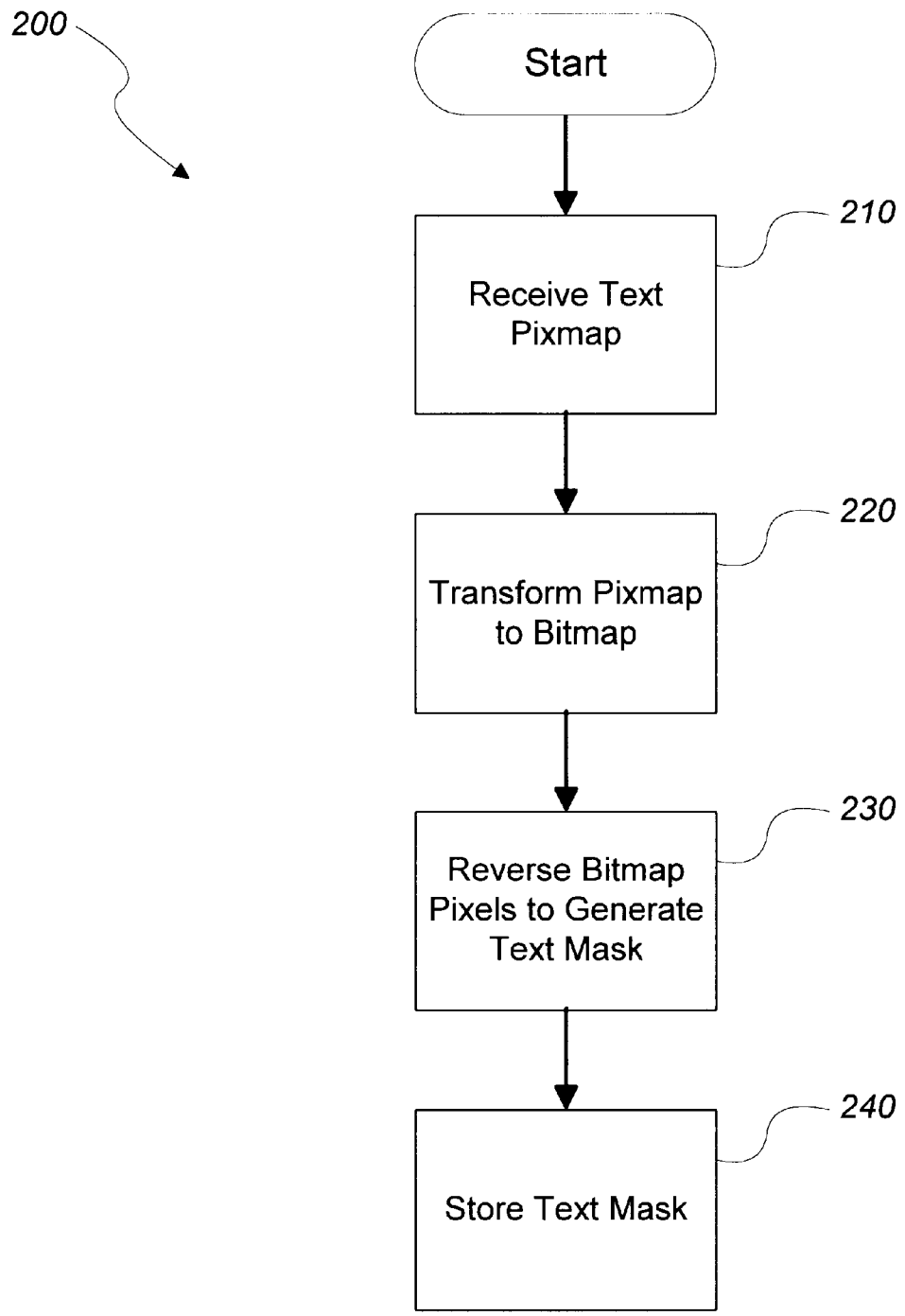
FIG. 2 is a flow diagram illustrating one embodiment of the method of FIG. 1.

FIG. 2 illustrates a method 200 that can be used to generate text masks from text pixmaps included in, or referred to by, an electronic document such as a hybrid data structure of the kind described in the '637 patent. The application receives an image pixmap, which can include coded lexical units and non-coded lexical units (step 210), and transforms the a pixmap into a bitmap in order to identify pixels in the pixmap that represent text (step 220), for example, by using the techniques described in the commonly-owned U.S. patent application Ser. No. 08/865,021, which is incorporated by reference herein as stated above. In this implementation, each pixel in the resulting bitmap that represents a portion of text is set to an "on" (or "1") value, while each pixel that does not represent a portion of text (e.g., a pixel that is a part of the local background of the text pixmap) is set to an "off" (or "0") value.

The application generates a text mask for a unit of text by "complementing" the value of each pixel in the bitmap for that unit of text (step 230). That is, for each pixel in the bitmap that originally was set to the "on" value, the application sets the pixel's value to "off," and for each pixel in the bitmap that originally was set to the "off" value, the application sets the pixel's value to "on." As a result, the text mask pixels that correspond to text are set to the "off" value, while the pixels that correspond to a background are set to the "on" value. When rendering the text mask to represent the text, the application applies a foreground color to the text mask as discussed below, treating the pixels set to "on" as opaque and the "off" pixels as transparent and thus effectively "painting" a character where the pixels are set to "off" in the text mask. In an alternate implementation, the text mask can be configured to allow the application to assign more than two pixel values to each pixel in the text mask. In this implementation, pixel values may correspond to such characteristics as the degree transparency of the text pixels when rendering the text on the background, which may, for example, provide for anti-aliasing at character edges if pixels at the boundary between text and background are assigned intermediate pixel values between the values representing the color of the text and background. The application can use the text mask to generate a representation of the text for display and/or can store the text mask, with our without other information relating to the image, for later retrieval and use in displaying a representation of the text. In one implementation, the text mask is generated and stored by a user executing one instance of the application, and is retrieved and used by another user to display a representation of the text.

In one implementation, the application generates a single text mask for all lexical units (or all non-coded units) to be displayed on a given page of the image; for images having multiple pages, in this implementation the application may generate a separate text mask for each image page. In an alternate implementation, the application can generate a separate text mask for each lexical unit (or non-coded unit), or for a subset of lexical units in the image—for example, for lexical units representing units of text that share a text color—and associate each text mask with position information linking the text mask to the appropriate position in the image. For example, in one implementation the application generates text masks only for non-coded lexical units, in which case coded lexical units can be represented by rendering coded representations as described in the '637 patent. The application can store the text mask in a hybrid data structure, which can include, for example, one or more text masks, information defining the image background, and coded information corresponding to recognized lexical units (step 240). Alternatively, the application can store the hybrid data structure and the text mask separately, with the hybrid data structure including a reference to the text mask, such as a pointer to the file in which the text mask is stored.

Figure 3:
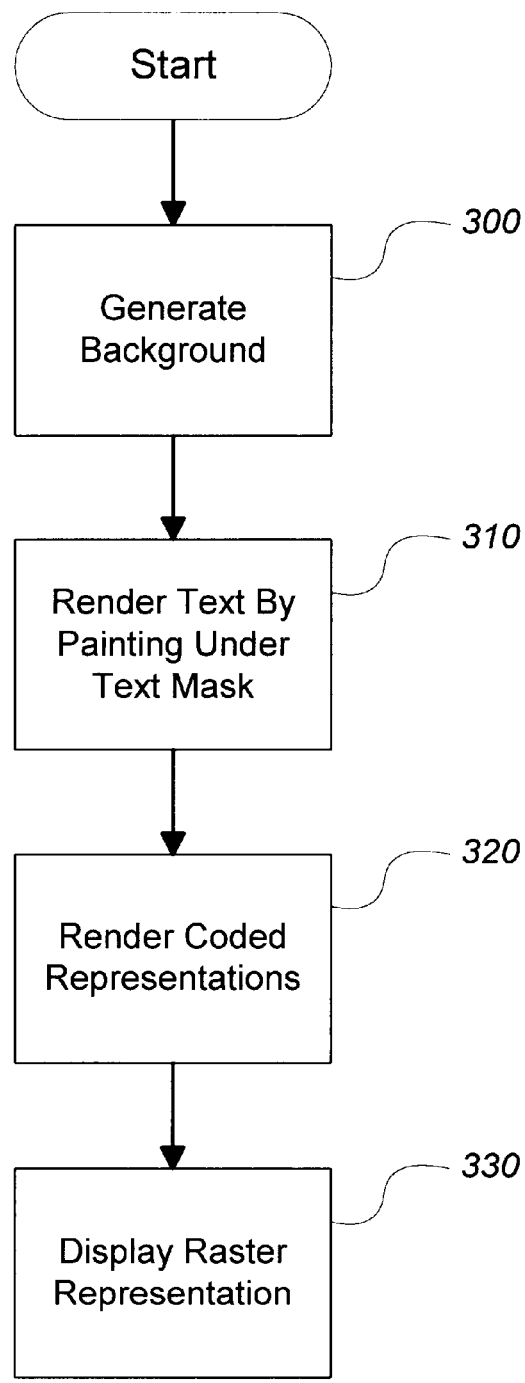
FIG. 3 is a flow diagram illustrating a method of using a text mask to represent one or more lexical units in a raster representation of an input document.

In the implementation illustrated in FIG. 3, the application uses a text mask to represent one or more noncoded lexical units in a raster representation of an input document. The application generates a background on which the text will be displayed (step 300). The application can generate the background by identifying background pixels in the input image and assigning corresponding set of pixels in the raster representation a pixel value corresponding to a background color from the input image, such as user-selected background color, an average background color in the input pixmap, or a more complex color scheme such as a color gradient. Alternatively, the background can be derived from other sources, such as other bitmaps or pixel maps representing other images. The application represents the text corresponding to one or more lexical units by assigning pixel values corresponding to a desired uniform foreground or text color (or group of colors) to pixels in the raster representation corresponding to the text pixels in the text mask for the lexical unit or units (step 310). Optionally, the application represents additional lexical units by using additional text masks corresponding to those units, or by rendering corresponding coded representations (step 320). The resulting raster representation of the image is displayed on a raster output device (step 330).

Figure 4A:
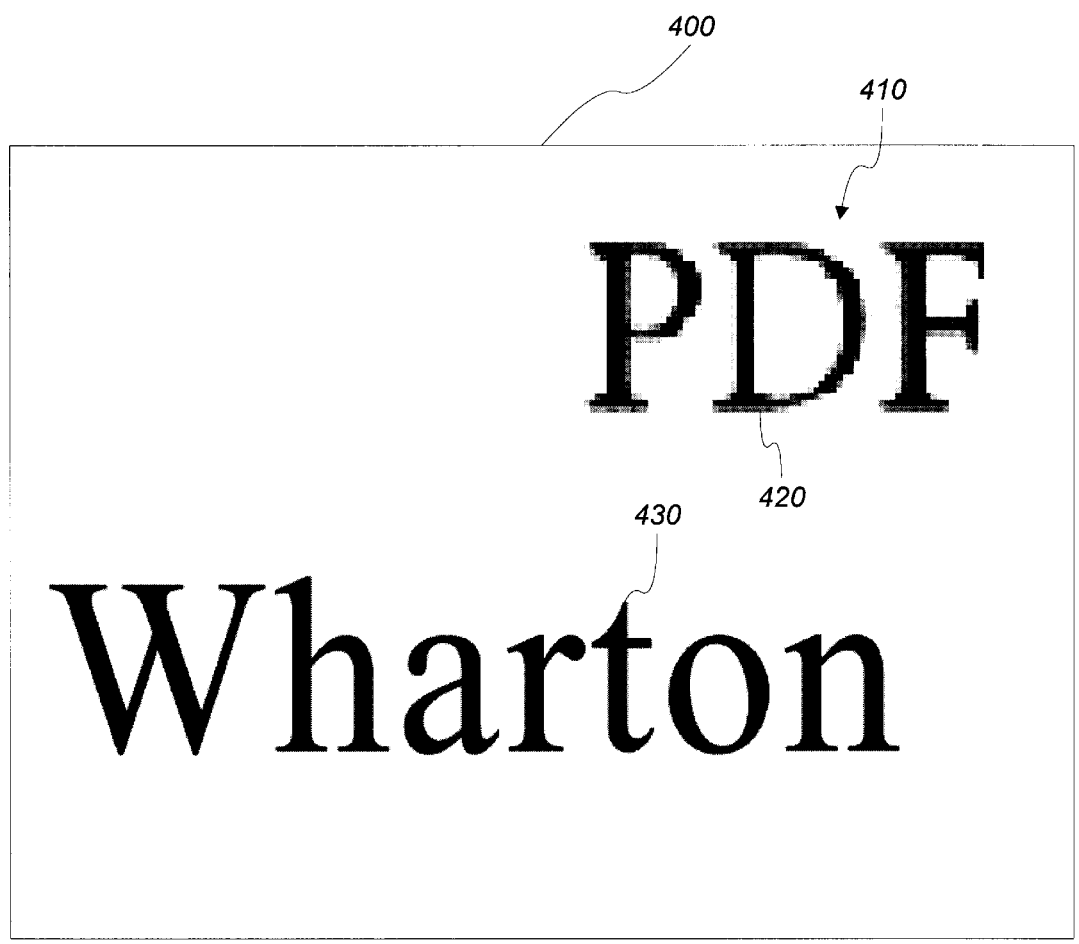
FIG. 4A is an example of a hybrid display exhibiting edge effects.
Figure 4B:
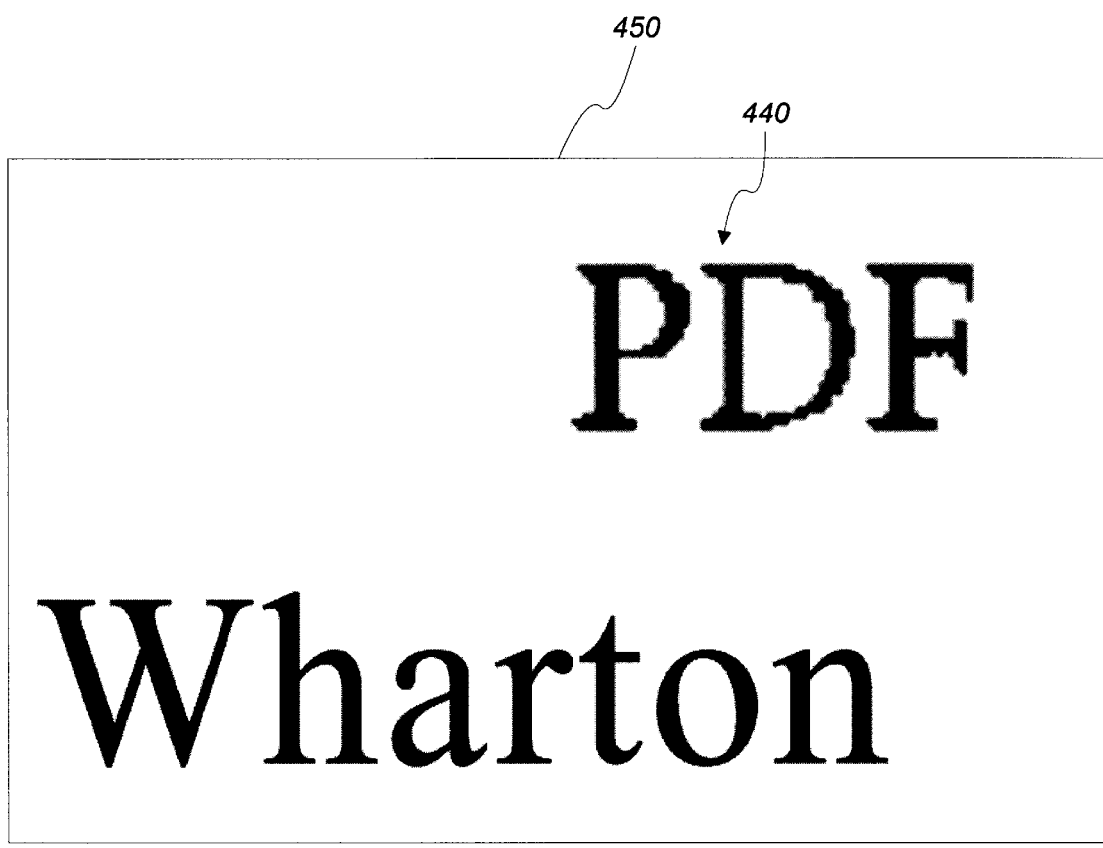
FIG. 4B is an example a hybrid display corresponding to the hybrid display of FIG. 4A rendered according to the present invention.

Edge effects can be reduced by using a text mask to render a corresponding pixmap of text. FIG. 4A shows an example of a hybrid display 400 on which text pixmap 410 having edge effects 420 is displayed with text 430 rendered from a coded representation. By contrast, when the application uses the text mask to render the text, it applies a uniform color to the pixels in the text mask, as described above. As shown in FIG. 4B, the resulting text 440 in display 450 exhibits significantly reduced edge effects in comparison to text 410 in FIG. 4A.

Figure 5A:
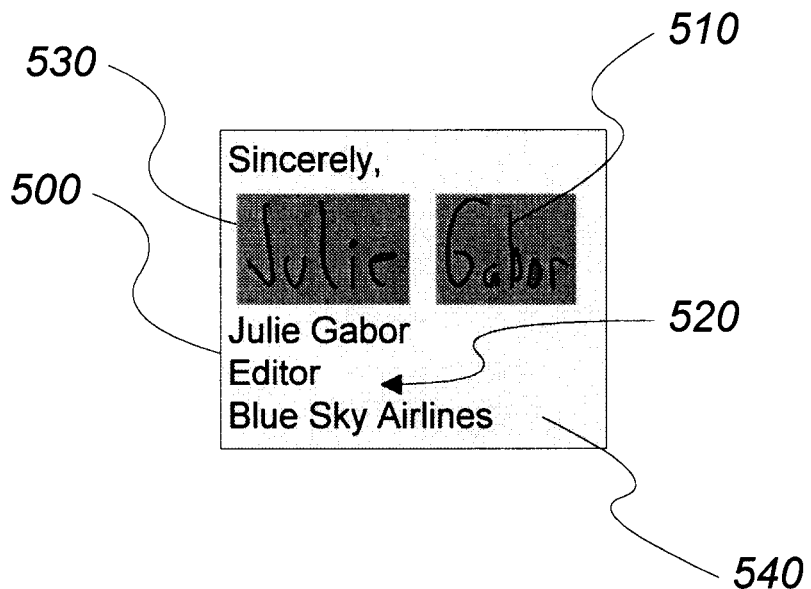
FIG. 5A is an example of a hybrid display exhibiting ghosting effects.
Figure 5B:
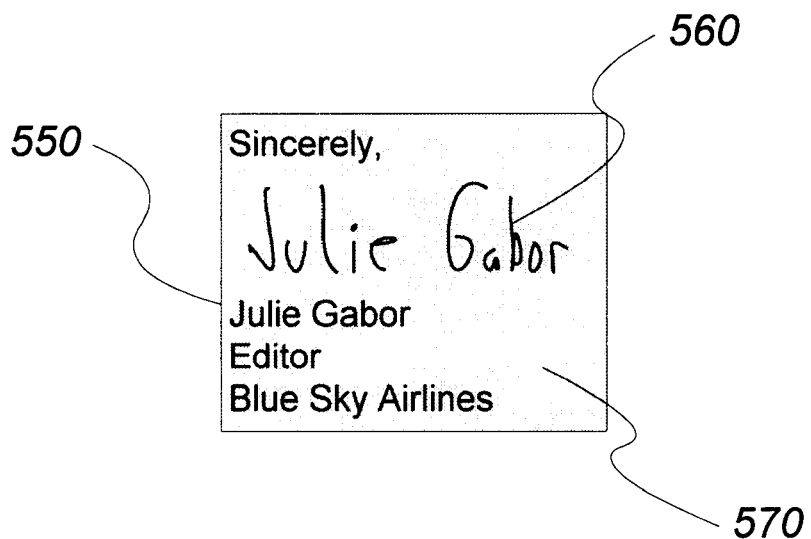
FIG. 5B is an example of a hybrid display corresponding to the hybrid display of FIG. 5A rendered according to the present invention.

Likewise, the application's use of a text mask reduces ghosting effects by masking out pixels corresponding to the local background in the hybrid display. FIG. 5A shows an example of a hybrid display 500 on which text pixmap 510 and rasterized text 520 are displayed. Ghosting results from the display of text pixmap 510 with local background 530, which does not match the global background 540 of the hybrid display 500. By contrast, FIG. 5B shows a hybrid display 550 in which the method has used a text mask to display text 560. Because text 560 is displayed on a global background 570 without local background 530, which has been masked out by the text mask, ghosting does not occur.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. Other embodiments are within the scope of the following claims. For example, the steps of the invention can be performed in a different order and still achieve desirable results. The invention can be performed over various regions of text, such as frames, single pages, or multiple pages and can be performed in both OCR and non-OCR applications. In OCR applications, a text mask can be generated to represent both coded and/or noncoded text. Also, the invention can operate with inputs including raster representations of single and/or multiple source images that were scanned or otherwise digitized and/or originally created in a digital form. Moreover, the text mask can be generated as a bitmap in which text pixels have a specified binary value or as a pixmap in which text pixels have a specified value or range of values. The text mask can represent text by displaying and/or printing the text mask, e.g., on a raster output device, by storing and/or referring to the text mask, e.g., in a hybrid or other type of data structure, and/or by including and/or referring to the text mask in a representation of an image set forth in a page description language of an electronic document. A data structure, electronic document, or other storage structure can refer to a text mask using, e.g., a pointer, handle, index, key, address, and/or uniform resource locator (URL). An electronic document does not necessarily correspond to a file. A document may be stored in a portion of a file that holds other documents, in a single file dedicated to the document in question, or in a set of coordinated files. The invention can be applied using a variety of page description languages, including, for example, PDF (Adobe® Portable Document Format), PostScript, HyperText Markup Language (HTML), Rich Text Format (RTF), Standard Generalized Markup Language (SGML), and eXtensible Markup Language (XML). For some page description languages, such as HTML, a language extension, such as CSS (Cascading Style Sheets), provides the functionality required to position text and graphics precisely on a page.

What is claimed is:

1. A method of processing an image including a non-coded lexical unit and a coded lexical unit, the non-coded lexical unit representing a unit of unrecognized text, the coded lexical unit representing a unit of recognized text, the method comprising:

generating a text mask having pixels distinguishing between a plurality of text pixels and a plurality of local background pixels associated with the non-coded lexical unit in the image;

generating a global background on which the non-coded lexical unit and the coded lexical unit is to be displayed, wherein one or more of the plurality of local background pixels associated with the non-coded lexical unit has a color mismatch relative to the global background;

rendering the coded lexical unit on the global background according to a character code representing the coded lexical unit, the coded lexical unit having a pre-determined foreground color; and using the text mask to represent the non-coded lexical unit on the global background without displaying the one or more of the plurality of local background pixels associated with the non-coded lexical unit that has a color mismatch relative to the global background, including masking off the pixels of the text mask corresponding to the plurality of local background pixels and painting a text character through the pixels of the text mask corresponding to the plurality of text pixels, the text character being painted on the global background with the pre-determined foreground color.

2. The method of claim 1, wherein:

the text mask includes a raster representation of the pixels of the non-coded lexical unit, the raster representation including a first set of pixels corresponding to the text pixels of the non-coded lexical unit and a second set of pixels corresponding to the background pixels of the non-coded lexical unit.

3. The method of claim 2, wherein:

generating the text mask includes assigning the first set of pixels in the raster representation a first pixel value and assigning the second set of pixels in the raster representation a second pixel value.

4. The method of claim 3, wherein:

generating the text mask includes reversing the pixel value of each pixel in the raster representation.

5. The method of claim 3, wherein:

generating the text mask includes assigning an intermediate pixel value to pixels in the raster representation at a boundary between the first and second set of pixels in the raster representation.

6. The method of claim 1, wherein:

the text mask includes a vector representation of the unrecognized text.

7. The method of claim 1, wherein:

the image includes a plurality of pages; and the method further includes, storing the text mask including storing a plurality of text masks, each stored text mask corresponding to one or more non-coded lexical units on a page of the image.

8. The method of claim 1, wherein:

the image includes one or more first non-coded lexical units representing one or more units of unrecognized text in a first text color and one or more second non-coded lexical units representing one or more units of unrecognized text in a second text color; and the method further includes, storing the text mask including storing a first text mask for the first non-coded lexical units and storing a second text mask for the second non-coded lexical units.

9. The method of claim 1, wherein:

the image includes a first non-coded lexical unit and a second non-coded lexical unit; and the method further includes, storing the text mask including storing a first text mask for the first non-coded lexical unit and a second text mask for the second non-coded lexical unit.

10. The method of claim 1, further comprising:

storing the text mask in a hybrid data structure.

11. The method of claim 1, further comprising:

storing the text mask in an electronic document representing the image, wherein the electronic document includes a page description language representation of the non-coded lexical unit in the image.

12. The method of claim 1, wherein:

generating the text mask includes identifying the text pixels of the non-coded lexical unit in an OCR process.

13. A computer program product, tangibly stored on a computer-readable medium, for processing an image including a non-coded lexical unit and a coded lexical unit, the non-coded lexical unit representing a unit of unrecognized text, the coded lexical unit representing a unit of recognized text, the product comprising instructions operable to cause a programmable processor to:

generate a text mask having pixels distinguishing between a plurality of text pixels and a plurality of local background pixels associated with the noncoded lexical unit in the image;

generate a global background on which the non-coded lexical unit and the coded lexical unit is to be displayed, wherein one or more of the plurality of local background pixels associated with the non-coded lexical unit has a color mismatch relative to the global background;

render the coded lexical unit on the global background according to a character code representing the coded lexical unit, the coded lexical unit having a pre-determined foreground color; and use the text mask to represent the non-coded lexical unit on the global background without displaying the one or more of the plurality of local background pixels associated with the non-coded lexical unit that has a color mismatch relative to the global background, including instructions to mask off the pixels of the text mask corresponding to the plurality of local background pixels and paint a text character through the pixels of the text mask corresponding to the plurality of text pixels, the text character being painted on the global background with the pre-determined foreground color.

14. The computer program of claim 13, wherein:

the text mask includes a raster representation of the pixels of the non-coded lexical unit, the raster representation including a first set of pixels corresponding to the text pixels of the non-coded lexical unit and a second set of pixels corresponding to the background pixels of the non-coded lexical unit.

15. The computer program of claim 14 wherein the instructions operable to cause a programmable processor to generate the text mask include instructions operable to cause a programmable processor to:

assign the first set of pixels in the raster representation a first pixel value; and assign the second set of pixels in the raster representation a second pixel value.

16. The computer program of claim 15 wherein the instructions operable to cause a programmable processor to generate the text mask include instructions operable to cause a programmable processor to:

reverse the pixel value of each pixel in the raster representation.

17. The computer program of claim 15 wherein the instructions operable to cause a programmable processor to generate the text mask include instructions operable to cause a programmable processor to:

assign an intermediate pixel value to pixels in the raster representation at a boundary between the first and second set of pixels in the raster representation.

18. The computer program of claim 13, wherein:

the text mask includes a vector representation of the unrecognized text.

19. The computer program of claim 13, wherein:

the image includes a plurality of pages; and the product further comprises instructions operable to cause a programmable processor to store the text mask including instructions operable to cause a programmable processor to store a plurality of text masks, each stored text mask corresponding to one or more non-coded lexical units on a page of the image.

20. The computer program of claim 13, wherein:

the image includes one or more first non-coded lexical units representing one or more units of unrecognized text in a first text color and one or more second non-coded lexical units representing one or more units of unrecognized text in a second text color; and the product further comprises instructions operable to cause a programmable processor to store the text mask including instructions operable to cause a programmable processor to store a first text mask for the first non-coded lexical units and a second text mask for the second non-coded lexical units.

21. The computer program of claim 13, wherein:

the image includes a first non-coded lexical unit and a second non-coded lexical unit; and the product further comprises instructions operable to cause a programmable processor to store the text mask including instructions operable to cause a programmable processor to store a first text mask for the first non-coded lexical unit and a second text mask for the second non-coded lexical unit.

22. The computer program of claim 13, wherein:

the product further comprises instructions operable to cause a programmable processor to store the text mask including instructions operable to cause a programmable processor to store the text mask in a hybrid data structure.

23. The computer program of claim 13, further comprising instructions operable to:

store the text mask in an electronic document representing the image, wherein the electronic document includes a page description language representation of the non-coded lexical unit in the image.

24. The computer program of claim 13, wherein the instructions operable to cause a programmable processor to generate the text mask include instructions operable to cause a programmable processor to:

identify the text pixels of the non-coded lexical unit in an OCR process.

* * * * *